United States Patent
Iwamura

(10) Patent No.: US 7,158,652 B2
(45) Date of Patent: Jan. 2, 2007

(54) METHOD OF USING PLURAL WATERMARKS TO PREVENT UNAUTHORIZED IMAGE COPYING

(75) Inventor: Keiichi Iwamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 542 days.

(21) Appl. No.: 09/793,634

(22) Filed: Feb. 27, 2001

(65) Prior Publication Data

US 2001/0024510 A1    Sep. 27, 2001

(30) Foreign Application Priority Data

Feb. 29, 2000    (JP)    ............................ 2000-053423

(51) Int. Cl.
*G06K 9/00* (2006.01)
(52) U.S. Cl. ...................................... 382/100
(58) Field of Classification Search ................ 382/100
See application file for complete search history.

(56) References Cited

U.S. PATENT DOCUMENTS

| | | | |
|---|---|---|---|
| 5,600,720 A | 2/1997 | Iwamura et al. | 380/1 |
| 5,636,292 A | 6/1997 | Rhoads | 382/230 |
| 5,666,419 A | 9/1997 | Yamamoto et al. | 380/28 |
| 5,937,395 A | 8/1999 | Iwamura | 705/30 |
| 6,002,772 A * | 12/1999 | Saito | 705/58 |
| 6,088,454 A | 7/2000 | Nagashima et al. | 380/49 |
| 6,122,403 A * | 9/2000 | Rhoads | 382/233 |
| 6,131,162 A * | 10/2000 | Yoshiura et al. | 713/176 |
| 6,282,650 B1 * | 8/2001 | Davis | 713/176 |
| 6,334,187 B1 | 12/2001 | Kadono | |
| 6,563,935 B1 * | 5/2003 | Echizen et al. | 382/100 |
| 6,574,350 B1 * | 6/2003 | Rhoads et al. | 382/100 |
| 6,668,068 B1 * | 12/2003 | Hashimoto | 382/100 |

FOREIGN PATENT DOCUMENTS

| | | |
|---|---|---|
| EP | 0 901 124 | 3/1999 |
| JP | 10-285381 | 10/1998 |
| JP | 11-075055 | 3/1999 |
| JP | 11-145840 | 5/1999 |
| JP | 2000-050047 | 2/2000 |
| WO | 99/36876 | 7/1999 |

OTHER PUBLICATIONS

Kim et al., "A Watermarking with Two Signatures", IEEE Second Workshop on Multimedia Signal Processing, Dec. 1998, pp. 394-398.*

Fridrich, "A Hybrid Watermark for Tamper Detection in Digital Images", Fifth International Symposium on Signal Processing and Its Applications, Aug. 1999, pp. 301-304.*

Mintzer et al., "If One Watermark is Good, are More Better?", IEEE International Conference on Acoustics, Speech, and Signal Processing, Mar. 1999, pp. 2067-2069.*

(Continued)

Primary Examiner—Bhavesh M. Mehta
Assistant Examiner—Patrick Edwards
(74) Attorney, Agent, or Firm—Fitzpatrick, Cella, Harper & Scinto

(57) ABSTRACT

An increasing number of people are employing a variety of methods of editing and processing digital content in an effort to illegally copy the content. It is difficult to develop digital watermark technology that is able to withstand all types of editing and processing. The present invention addresses the foregoing problems by providing a digital content processing method comprising performing a plurality of copyright protection processes on digital content, each copyright protection process differing in difficulty of being analyzing, and distributing the processed digital content.

36 Claims, 5 Drawing Sheets

OTHER PUBLICATIONS

"A Digital Watermark Technique Based on the Wavelet Transform and its Robustness on Image Compression and Transformation", H. Inoue, et al., SCIS'98-32A, The Institute of Electronics, Information and Communication Engineers, Jan. 1998.

"A Method of Watermarking under Frequency Domain for Protecting Copyright of Digtal Image", T. Nakamura, et al., SCIS'97-26A, The Institute of Electronics, Information and Communication Engineers, Jan. 1997.

"Techniques for Data Hiding", Storage and Retrieval for Image and Video Databases III, SPIE Proceedings, vol. 2420, pp. 164-173, Feb. 1995.

"Experimental Study of Safety and Reliability of Digital Watermarking Technology Using Wavelet Transform", Hirokazu Ishizuka, et al., SCIS'97, The Symposium on Cryptography and Information Security, Japan, Jan. 29-Feb. 1, 1997.

* cited by examiner

METHOD OF USING PLURAL WATERMARKS TO PREVENT UNAUTHORIZED IMAGE COPYING

BACKGROUND OF THE INVENTION

1. Field of the Invention

This invention relates to a digital content processing method, a valuable paper processing method and computer program product for processing digital content or valuable paper for secure distribution.

2. Description of the Related Art

Recently, the remarkable development of computers and networks has allowed many types of information such as text, images and sound, to be stored and processed using computers and networks. The above-mentioned types of information are generally stored as digital data, which is relatively easy to copy. Accordingly, it is common to embed copyright information or user information in digital data such as image data and audio data, in an effort to prevent illegal copying. Digital watermarks provide a system where specific data is secretly embedded in the image data or audio data using predetermined processing of the image data or audio data. It is then possible to obtain copyright information, user information or an identification number from the specific data and to identify a person or a product that made an illegal copy.

Ideal digital watermarks have several characteristics. First, the embedded information of the digital watermark should not be noticeable. In other words, the information should be embedded without degrading the quality of the original. Second, the embedded information should not be lost when editing or other processing such as data compression or filtering is performed. Third, the amount of information to be embedded should be variable. However these ideal characteristics of digital watermarks may be incompatible with each other. For example, in the case where a digital watermark is embedded in an image, the amount of embedded information needed to prevent loss of information during editing or processing of the image often degrades the image quality.

There are several known methods for embedding digital watermarks. Methods of embedding digital watermarks can be roughly categorized into two types: methods embedding information in a spatial area and methods embedding information in a frequency area. For example, "Techniques for Data Hiding," Proceedings of the SPIE, San Jose, Calif., USA, (IBM) W. Bender, D. Gruhl and N. Morimoto, February 1995, and U.S. Pat. No. 5,636,292 describe two examples of methods embedding information in a spatial area. The following are a few examples of methods embedding information in a frequency area. A method using Discrete Cosine Transform is described in "Digital Watermark Method in a Frequency Area for Protecting Copyright of a Digital Image" (NTT) Nakamura, Ogawa, Takashima, SCIS'97-26A, January 1997. A method using Discrete Fourier Transform is described in "A Watermark Signature Method for an Image by Using PN Series" (National Defense Academy) Ohonishi, Oka, Matui, SCIS'97-26B, January 1997. Methods using Wavelet Transform are described in "Experimental Considerations Related to Safety and Reliability of Digital Watermark Technology Using Wavelet Transform" (Mitsubish, Kyushu University) Ishizuka, Ishi, Sakurai, SCIS'97-26D, January 1997 and "Digital Watermark Image Compression Based on Wavelet Transform, About Robusty for Conversing Process" (Matushita) Moue, Myazaki, Yamamoto, Katura, SCIS'98-32A, January 1998.

The above-mentioned digital watermark techniques may be used for copyright protection of digital content such as still images, moving images and audio. Additionally, digital watermark techniques can be used in preventing counterfeiting of money or valuable securities. However, even when the above techniques are used, it may still be possible to edit or process the digital content in order to intentionally pirate copyrighted digital content.

The complexity and capabilities of editing and processing techniques used for copyright piracy are constantly improving. An increasing number of people edit and process digital content in different ways for the purpose of illegally copying the content. It is difficult to develop digital watermark technologies that are capable of surviving all types of editing and processing.

SUMMARY OF THE INVENTION

An object of the present invention is to address the foregoing problems.

One particular object of the present invention is to provide effective protection against editing and processing embedded digital watermarks for the purpose of infringing copyrighted material or counterfeiting valuable paper such as money or securities.

According to one aspect, the present invention concerns a digital content processing method comprises the steps of performing a plurality of copyright protection processes on digital content and distributing the processed digital content, wherein each of the plurality of copyright protection processes differs in difficulty of being analyzed.

According to another aspect, the present invention concerns a digital content processing method comprises the steps of performing a plurality of copyright protection processes on digital content, distributing a first extracting unit for part of the plurality of copyright protection processes, and extracting information from the digital content using the first extracting unit for part of the plurality of copyright protection processes and a second extracting unit for the remaining copyright protection processes.

According to another aspect, the present invention concerns a valuable paper processing method comprises the steps of performing a plurality of counterfeit prevention processes in printing valuable paper and circulating the processed valuable paper, wherein each of the plurality of counterfeit prevention processes differs in difficulty of being analyzed.

According to another aspect, the present invention concerns a valuable paper processing method comprising the steps of performing a plurality of counterfeit prevention processes in printing valuable paper, distributing a first extracting unit for part of the plurality of counterfeit prevention processes, and extracting information from the valuable paper using the first extracting unit for part of the counterfeit prevention processes and a second extracting unit for the remaining counterfeit prevention processes.

According to another aspect, the present invention concerns a processing method comprising the steps of embedding a first digital watermark in digital content, embedding a second digital watermark in the digital content, and distributing the digital content embedded with both the first digital watermark and the second digital watermark.

According to another aspect, the present invention concerns a processing method comprising the steps of embedding a first digital watermark in valuable paper, embedding a second digital watermark in the valuable paper, and circulating the valuable paper embedded with both the first digital watermark and the second digital watermark.

The present invention has a significant advantage in providing greater security for digital content or valuable paper by utilizing a plurality of protection processes. If one or part of the protection processes are bypassed or removed, the remaining protection processes remain intact.

Additional objects and advantages of the present invention may become apparent to one skilled in the art based on the following detailed description of the present invention.

DETAILED DESCRIPTION OF THE PREFERRED EMBODIMENTS

First Embodiment

A first embodiment of the present invention provides a system which embeds a plurality of digital watermarks in digital content. Information related to some of the embedded watermarks is available to the public, while information related to the remaining watermarks is kept confidential. Using the publicly available information, a person attempting to make an illegal copy edits and processes the digital content in order to remove the digital watermarks. The counterfeiter will be under the impression that he has removed all of the digital watermarks from the digital content. However, those digital watermarks that were kept confidential remain.

Figure 1:
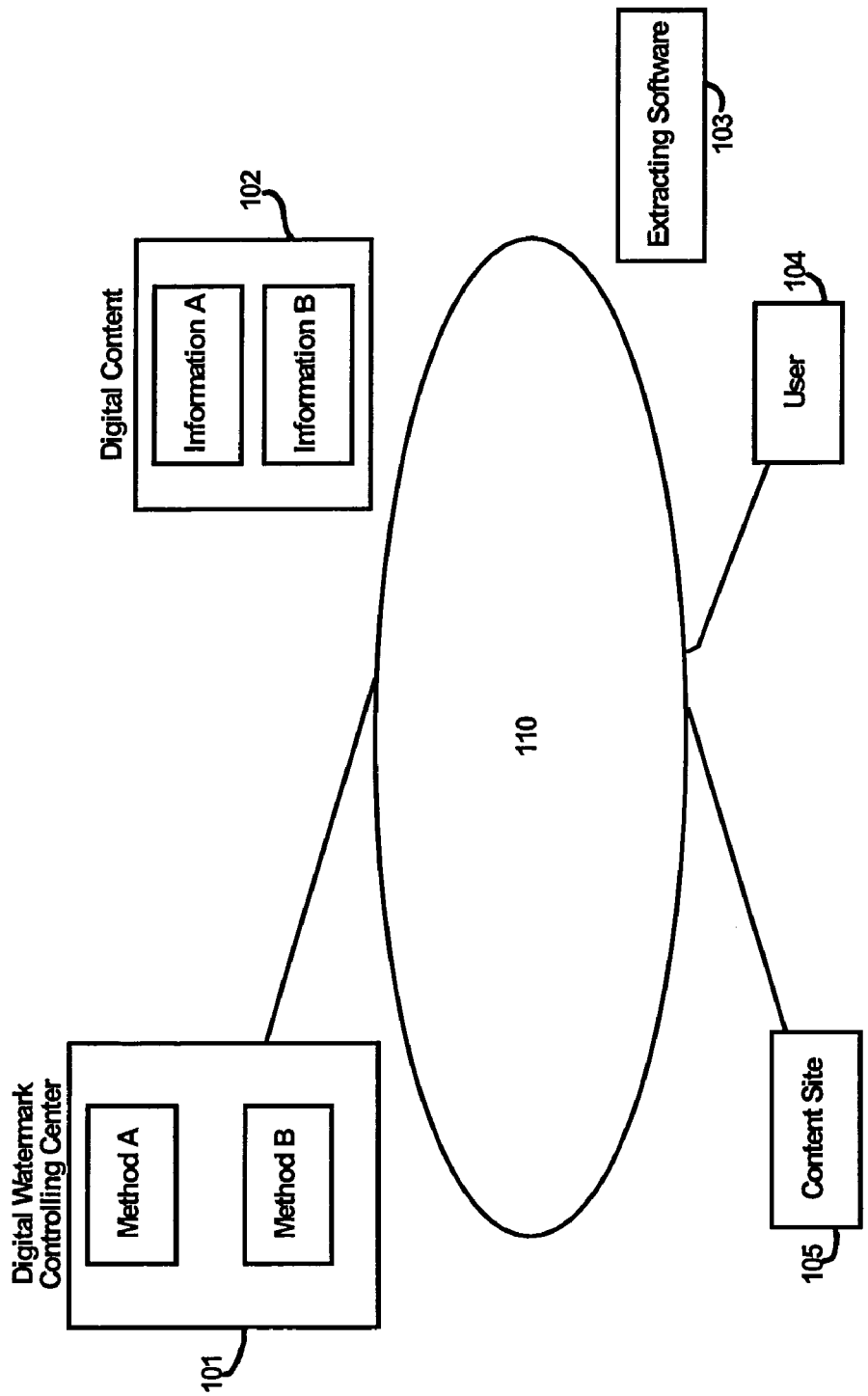
FIG. 1 is a diagram which shows a system of the first embodiment.
Figure 2:
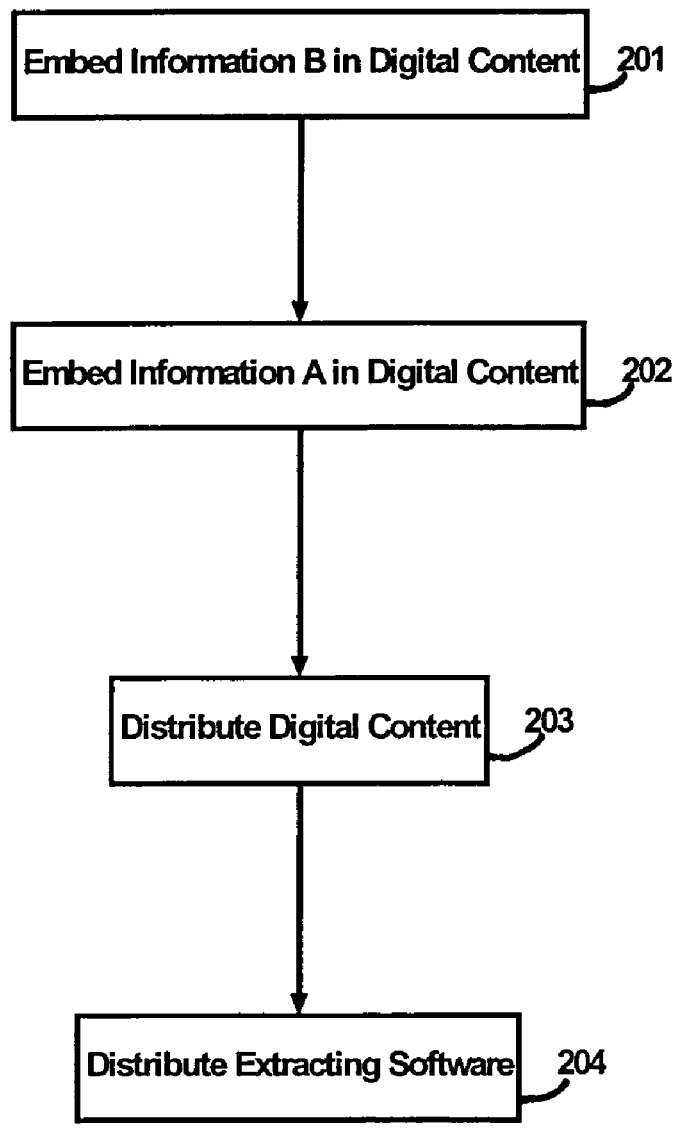
FIG. 2 is a flowchart which shows a process sequence of the first embodiment.

FIG. 1 is a diagram which shows a system of the first embodiment and FIG. 2 is a flow chart of a process of the first embodiment. Digital watermark controlling center 101 utilizes many types of digital watermarks, each digital watermark type employing different methods for embedding and removing the watermark.

In this embodiment, digital watermark controlling center 101 prepares two methods (method A and method B) for embedding digital watermarks. The two methods differ in how digital watermarks are embedded and removed. For example, information embedded using method B cannot be removed using a processing method designed to remove information embedded using method A.

Digital watermark controlling center 101 embeds information B in digital content 102 using method B (step 201) and information A in digital content 102 using method A (step 202). Digital watermark controlling center 101 then distributes digital content 102 to user 104, who has requested to buy it, through network 110 (step 203). In this case, personal information of user 104 is embedded in digital content 102 using method B. The embedded personal information is used to identify a user from an illegal copy of digital content 102.

When the area of digital content 102 in which information A is embedded is different from the area in which information B is embedded, the order in which information A and information B are embedded in digital content 102 is selectable. When information A and information B are embedded in the same area, the order of embedding information A and information B is decided on the basis of their vulnerability to being destroyed. In the first embodiment, information A and information B are embedded in the same area of digital content 102. Information B, which is less vulnerable to being destroyed than information A, is embedded in digital content 102 first followed by information A.

In this first embodiment, digital watermark controlling center 101 distributes extracting software 103 for extracting a digital watermark embedded using method A to user 104, who purchased digital content 102 (step 204). Distribution of extracting software 103 is performed in advance or at the time digital content 102 is distributed. Extracting software 103 can be distributed through network 110 or by distributing copies of extracting software 103 stored on a recording medium such as a CD-ROM, floppy disk, etc. The embedding method and existence of method B is kept confidential.

Using extracting software 103, user 104 can freely read digital watermark information embedded in digital content 102 using method A, and use the embedded digital watermark information in the following ways. (1) User 104 can confirm the digital watermark information embedded in digital content 102 is accurate and identify any wrong user information that has been embedded. As a result, user 104 can avoid the situation where digital watermark controlling center 101 alleges user 104 illegally distributed digital content 102 based on wrong information extracted from an illegal copy of digital content 102. (2) User 104 can run a check on digital watermark information embedded in digital content which belongs to an arbitrary site 105 accessed by user 104, and check for improper use of the digital content. Additionally, if user 104 informs digital watermark controlling center 101 or a monitoring center (not shown) of improper use, the burden of policing for illegal distribution by digital watermark controlling center 101 or a monitoring center will decrease. (Policing for abuse of distributed digital content by digital watermark controlling center 101 or a monitoring center could require thousands of man-hours.)

If extracting software 103 for extracting the digital watermark is widely distributed, a user planning illegal distribution of digital content can analyze extracting software 103 and discover how to remove the embedded digital watermark information. Digital watermark controlling center 101 keeps the embedding method and existence of method B confidential for this reason. Since method A and method B differ in the manner in which information is embedded and removed, digital watermark information embedded using method B (Information B) cannot be destroyed using a method for removing digital watermark information embedded using method A (Information A). Since a user making an illegal copy does not know the digital content is protected by a plurality of digital watermarks, he will believe that removal of Information A will allow successful illegal distribution of the digital content.

Digital watermark controlling center 101 extracts digital watermarks from suspected illegal copies of digital content 102 using extracting software for both method A and method B. In the case where digital watermarks from both method A and method B were extracted, the digital content would be considered unaltered. In the case where only digital watermarks from Method B were extracted, the digital content would be considered altered such that digital watermarks from Method A were removed. In the case where no digital watermarks from either Method A or Method B were extracted, the digital content would be considered not to have been embedded with digital watermark information, and therefore not to have been distributed by digital watermark controlling center 101.

Digital watermark controlling center 101 can identify the person making an illegal distribution on the basis of the user's personal information extracted from the digital watermark embedded by method B. In the present embodiment, if one digital watermark were destroyed, the other would remain.

The above-mentioned system is explained in the case where digital watermark controlling center 101 embeds two digital watermarks using method A and method B. In the alternative, digital watermark controlling center 101 may use three or more digital watermarks, thereby decreasing the vulnerability of the digital watermarks being destroyed as the number of digital watermarks used increases. Information A and information B may contain the same information or each may contain information different from the other.

When two or more digital watermarks are used, information may be embedded in the digital content using different methods for each digital watermark or the same method for a portion of the digital watermarks and a different method for the remaining digital watermarks. A digital watermark embedding information in a spatial area and a digital water mark embedding information in a frequency area are considered different methods. Generally speaking, a digital watermark embedding information in a spatial area is less vulnerable to being destroyed than one embedded in a frequency area. Since information embedded in a spatial area is distributed over an entire image in a spatial domain, changing a part of the image has little effect in the spatial domain.

The following is an example explaining the embedding and removal of a digital watermark. In this example, the input image data is a copyrighted still image. The image data are divided into blocks of 8 by 8 pixels and a Discrete Cosine Transform (DCT) is applied to each block of image data using a DCT coefficient. The resulting block is called a "DCT coefficient block" and a set of DCT coefficient blocks for the still image is called a "DCT coefficient block group." A DCT is applied to image data by a DCT circuit. One of the DCT coefficient blocks is selected from the set of DCT coefficient blocks output by the DCT circuit, and a 1 bit digital watermark is embedded by quantizing the DCT coefficient in the selected DCT coefficient block. In this case, the size of the quantization step affects the intensity of the digital watermark. The size of the quantization step and the position of the selected DCT coefficient block are key information.

For example, the value of a DCT coefficient at coordinate (u,v) is s{u,v}, a quantization step is "h" and a digital watermark bit of "0" or "1" is embedded in a processed image on the basis of the following rule.

$$a \times h \leq s\{u,v\} \leq (a+1) \times h \quad (1)$$

First, "a" is calculated using mathematical formula (1). Then, when the embedded bit equals 0, c{u,v} is calculated using mathematical formula (2).

$$c\{u,v\} = b \times h + h/2 \quad (2)$$

("b" is an even number and equal to either "a" or "a+1"). When the embedded bit equals 1, c{u,v} is calculated using mathematical formula (3).

$$c\{u,v\} = b \times h + h/2 \quad (3)$$

("b" is an odd number and equal to either "a" or "a+1") c{u,v} is a coefficient after the digital watermark has been embedded. Finally, a set of DCT coefficient blocks including the DCT coefficient block embedded with the digital watermark are applied an Inverse DCT (IDCT) and blocks of 8 by 8 pixels are restored. Embedding the digital watermark in the image is now complete.

A method for extracting the digital watermark will now be described. First, the DCT coefficient block embedded with a digital watermark is selected from the set of DCT coefficient blocks using the key information. Then "b" is calculated using mathematical formula (4).

$$b \times h < c\{u,v\} \leq (b+1) \times h \quad (4)$$

If "b" is an even number, the embedded bit is judged as "0". If "b" is an odd number, the embedded bit is judged as "1".

The following is considered as a method for making the embedded information more robust. The embedded information can be more robust by selecting a DCT coefficient representing a low frequency component when a DCT coefficient block for embedding a digital watermark is selected from a set of DCT coefficient blocks. A high frequency component of an image is lost easier than a low frequency component of the image when image compression or other various filter processes are performed.

The selected DCT coefficient is one bit and the embedded DCT coefficient is one bit in the above-mentioned embedding method. However, if the selected DCT coefficient and the embedded DCT coefficient are increased, the embedded information could be more robust. The reason for this is the following. If 1 bit information is embedded in one DCT coefficient block, the 1 bit information can easily be lost when image compression or other various filter processes are performed. However, when a plurality of the same bits are embedded in each DCT coefficient block, it is rare that all of the bits will be lost.

The embedded information can be more robust by applying error-correcting code to the embedded bits. If some of the embedded bits are lost, the lost bits can be reproduced using the error-correcting coded information. As the correcting ability of the error-correcting code is improved, the possibility of losing the embedded information decreases. There is a similar trend for decreasing the possibility of being lost when using Wavelet Transforms, Fourier Transforms or methods changing pixel value directly, apart from DCT. It is apparent that embedding digital watermarks differing in method of embedding and removal can be realized using a combination of the above-mentioned methods.

Figure 3:
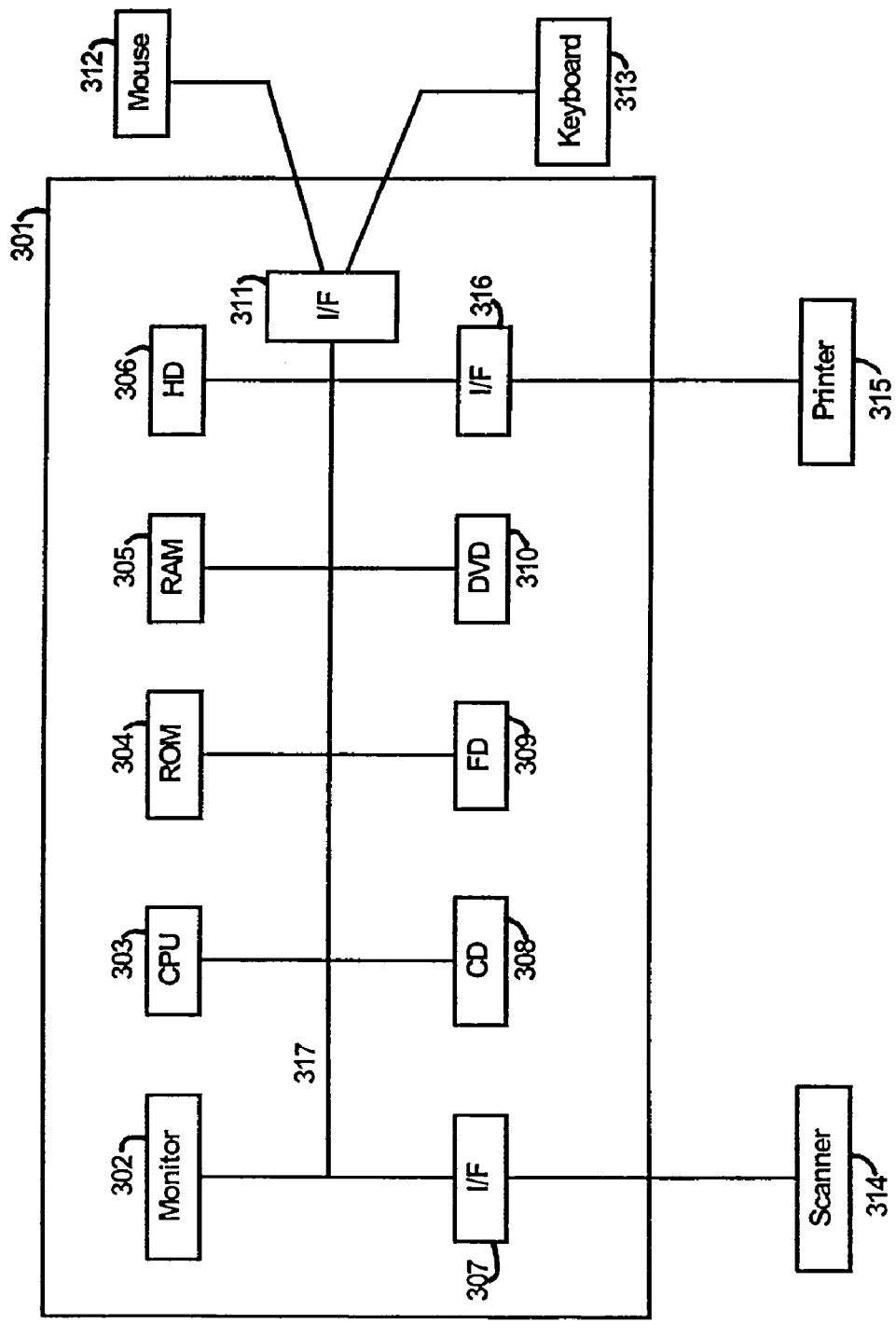
FIG. 3 is a diagram which shows a signal processing apparatus of the first embodiment.

The processing by digital watermark controlling center 101, embedding a digital watermark in an image and then extracting the embedded digital watermark can be realized using a signal processing apparatus as shown in FIG. 3. In FIG. 3, host computer 301 is a popular personal computer which can input an image read by scanner 314, manipulate the image and store the image. Furthermore, host computer 301 includes a monitor 302 and can print an image using printer 315 by transmitting image data through interface 316. Various manual instructions can be inputted by a user with mouse 312 and keyboard 313. Blocks 302 to 311 and 316 in FIG. 3 are connected with bus 317 and can communicate various data inside host computer 301.

Central Processing Unit (CPU) 303 controls the blocks and executes a program stored in host computer 301. Read Only Memory (ROM) 304 stores a copy-protected image and required image processing programs in advance. Random access memory (RAM) 305 temporarily stores a program or image data to be processed by CPU 303. Hard disc 306 stores a program or processed image data transferred to RAM 305 in advance or can store processed image data. Scanner interface 307 is connected to scanner 314 which scans an original or film with a charge coupled device (CCD). Scanner 314 then generates image data and scanner interface 307 can receive the image data generated by scanner 314. Compact Disc (CD) drive 308 reads data stored on a CD or a Compact Disc Recordable (CD-R) and writes data on a CD or a CD-R. Floppy Disc (FD) drive 309 reads data stored on a FD and writes data on a FD. Digital Versatile Disc (DVD) 310 reads data stored on a DVD and writes data on a DVD. If an image manipulation program or a printer driver is stored on CD, FD or DVD, the program or driver is installed on HD 306 and transferred to RAM 305 when needed. Interface 311 is connected to mouse 312 or keyboard 313 for inputting instructions from mouse 312 or keyboard 313.

Second Embodiment

Figure 4:
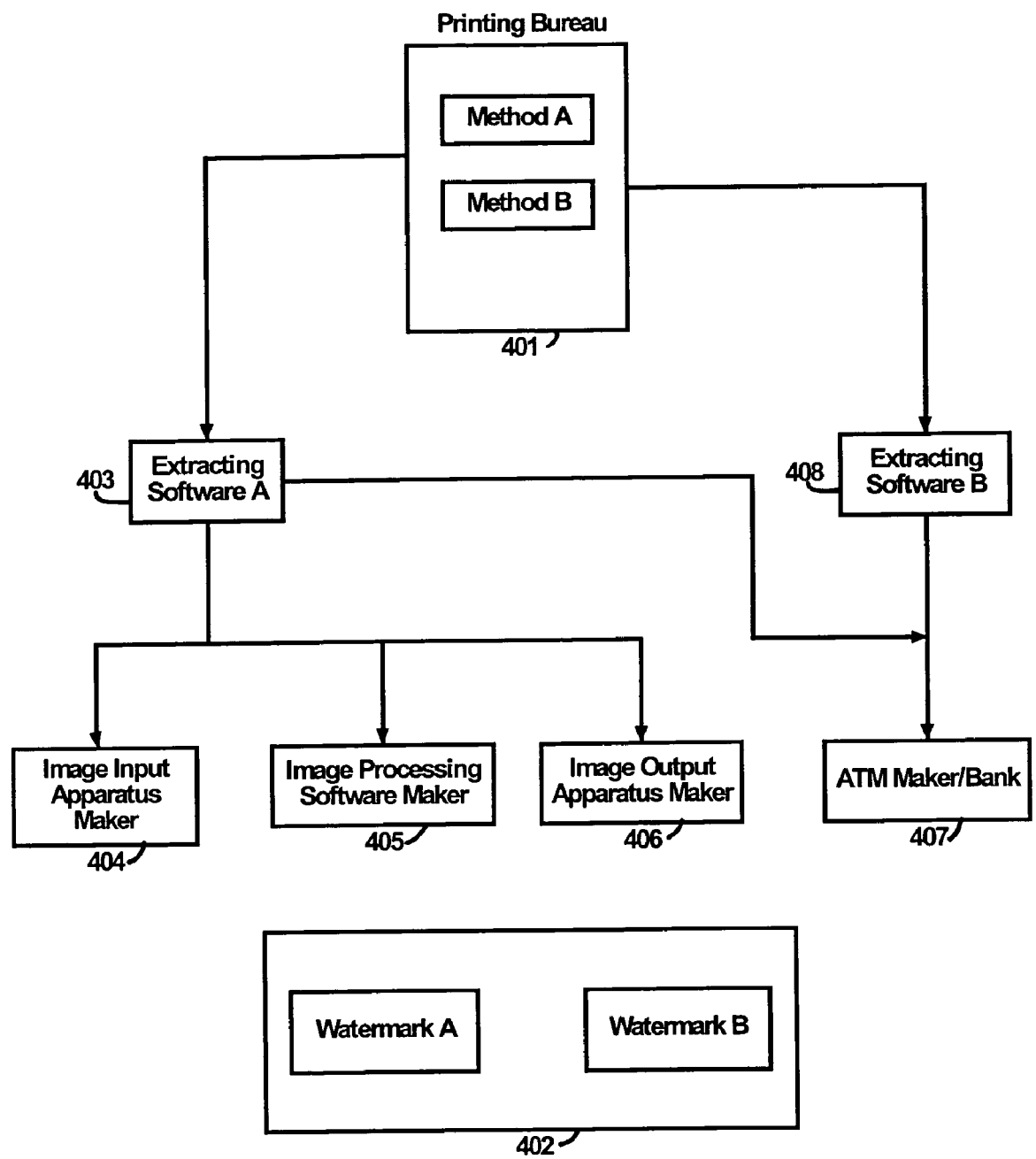
FIG. 4 is a diagram which shows a system of the second embodiment.
Figure 5:
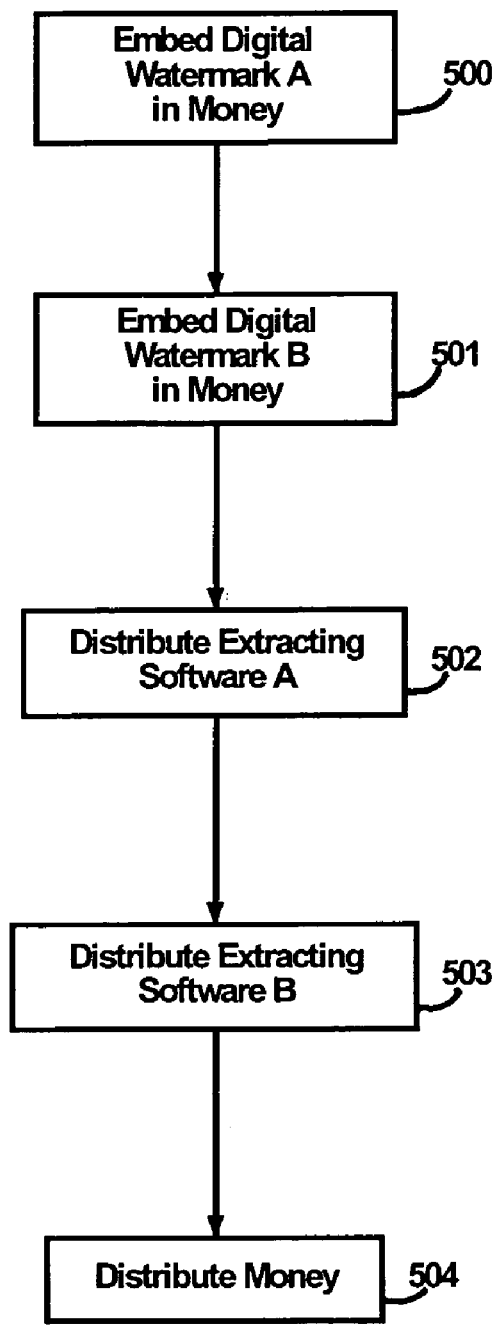
FIG. 5 is a flow chart which shows a process sequence of the second embodiment.

This embodiment concerns preventing the counterfeiting of valuable paper such as money, securities, certificates, etc., by applying different types of digital watermarks. The second embodiment is explained using FIG. 4 and FIG. 5.

Printing bureau 401 adopts many types of digital watermarks to be used as counterfeit prevention methods and utilizes them in printing money 402. In this example, printing bureau 401 adopts method A, which embeds digital watermark A, and method B, which embeds digital watermark B. Printing bureau prints money 402 with digital watermark A embedded in money 402 using method A and digital watermark B embedded in money 402 using method B (steps 500 and 501).

Printing bureau 401 distributes extracting software A 403 for the detection and removal of digital watermark A to image input apparatus maker 404, image processing software maker 405 and image output apparatus maker 406, which produce products having the capability to be used for counterfeiting (step 502). Printing bureau 401 asks the above-mentioned makers to install extracting software A 403 in their products (apparatuses and software) and provide a counterfeit prevention function to prevent their products from being used for counterfeiting in accordance with an extracting result obtained by extracting software A 403. For example, if extracting software 403 detects digital watermark A in data being processed by the apparatus or software, the function would not allow the apparatus or software to continue processing that data. Each maker 404, 405 and 406 installs extracting software A 403 and the function mentioned above in their products' driver or software prior to selling their products. Each maker 404, 405 and 406 further creates a system for installing and upgrading extracting software A 403 in their products (apparatuses and software, including products already sold) by using the Internet or through distribution of an upgrade stored on CD-ROM, floppy disk, etc.

Printing bureau 401 also distributes extracting software A 403 to Automated Teller Machine (ATM) maker and bank 407 (step 502). In addition, printing bureau 401 distributes extracting software B 408, for the detection and removal of digital watermark B, to ATM maker and bank 407 (Step 503). Printing bureau 401 requests ATM maker and bank 407 to install extracting software A 403 and extracting software B 408 in their ATMs. Extracting software B 408 is kept confidential by printing bureau 401, and is only distributed to selected parties such as ATM maker and bank 407 to be used in their ATMs. It goes without saying that ATM maker and bank 407 exercise strict control over ATMs.

Finally, printing bureau 401 distributes money 402 to the public, money 402 having been embedded with digital watermark A and digital watermark B (step 504).

A counterfeiter may attempt to make counterfeit money by scanning money using an image input apparatus such as a scanner, manipulating the scanned image with image processing software and printing the scanned image using an image output apparatus such as a color printer. However, the counterfeiter generally will fail when the above-mentioned image input/output apparatuses and image processing software used by the counterfeiter have extracting software A 403 and the function mentioned above installed to prevent counterfeiting.

Generally speaking, it is conceivable that installing extracting software A 403 for digital watermark A in image input/output apparatuses or image processing software will be successful in preventing successful counterfeiting by users who make copies of money either for fun or by mistake. However, a serious counterfeiter may analyze the installed extracting software A 403 for digital watermark A and the function to prevent counterfeiting, and try to bypass the function. Since scanners, printers and image processing software are inexpensive and easy to obtain, a serious counterfeiter may succeed with enough time and effort.

If a counterfeiter succeeds in counterfeiting money, digital watermarks embedded in money 402 would be destroyed in the counterfeit money during the process of outputting the image data obtained scanning money 402 without performing proper processes. It is possible to check for counterfeit money by detecting the presence or absence of digital watermarks. However, if the counterfeiter analyzed extracting software A 403 and digital watermark A, he could possibly embed digital watermark A in counterfeit money in an attempt to circumvent the counterfeit prevention.

In this embodiment, digital watermark B is easier to destroy than digital watermark A and is lost during the processes of scanning money 402 and printing counterfeit money based on the scanned image data. A machine dealing with money, such as an ATM, implements not only extracting software A 403 for digital watermark method A but also extracting software B 408 for digital watermark method B. The ATM scans money in order to determine if the money is genuine or not by detecting whether both digital watermarks A and B are embedded in the money. When both digital watermark A and digital watermark B are embedded in the money, the ATM can verify that the scanned money is genuine. However, as mentioned above, digital watermark B is destroyed in the process of scanning and printing counterfeit money. Accordingly, counterfeit money is detected when digital watermark B is not detected in the scanned money. Since control of the ATM is tight, it is difficult for a counterfeiter to analyze extracting software B 408 and digital watermark B. Accordingly, it is possible through the use of different types of counterfeit prevention means to prevent the crime of counterfeiting money.

The above-mentioned embodiment is explained in the case where printing bureau 401 embeds two digital watermarks in money 402. However, the invention is not limited to using only two digital watermarks. For example, printing bureau 401 may embed three or more digital watermarks in money 402. It is apparent that counterfeit prevention improves as the number of counterfeit prevention methods used increases.

In a case where three or more counterfeit prevention methods are being used (e.g. methods A, B, C and D), methods A and B might be used in image processing products (e.g. scanner, printer, image processing software) and ATMs as discussed above, while methods C and D are used by only printing bureau 401 or the police for use in detecting counterfeiting of money. It is easy to understand that this embodiment would also be beneficial in preventing counterfeiting of other items such as valuable securities.

Third Embodiment

In the first and second embodiments, one of the two types digital watermark methods was distributed or installed in digital processing products. However, the known digital watermark method need not be disclosed in this manner. For example, the same effect as that obtained in the first and the second embodiments can be achieved if controlling center 101 or printing bureau 401 makes digital watermark method A available to the public with a technical thesis or a patent and digital watermark method B is kept confidential.

The same effect as that in the first and second embodiments can be obtained by adopting the following systems in the case where controlling center 101 or printing bureau 401 makes nothing available to the public. The following systems can be realized using digital watermarks that differ in their difficulty of being analyzed and removed.

1) Controlling center 101 or printing bureau 401 adopt a well-known digital watermark as method A and an original digital watermark as method B.

2) Controlling center 101 or printing bureau 401 adopts non-breakable (breakable) digital watermark as method A and a breakable (non-breakable) digital watermark as method B.

3) Controlling center 101 or printing bureau 401 adopts method A that results in high degradation of the original when the digital watermark is embedded and method B that results in low degradation of the original when the digital watermark is embedded.

A counterfeiter may doubt whether methods for preventing copying, such as digital watermarks, are being employed in copyrighted digital content or money. The counterfeiter may try analyzing the copyrighted digital content or money using analyzing methods like the following: (1) Analyzing the digital content or money using analyzing methods for well-known digital watermarks; (2) Analyzing the digital content using JPEG compression or small geometrical conversions; or (3) Analyzing characteristic signals generated by executing Discrete Cosine Transform (DCT) or Discrete Fourier Transform (DFT).

A counterfeiter will believe that he is successful in counterfeiting by destroying an embedded digital watermark discovered using the above-mentioned analyzing methods. He then will distribute the counterfeited content or money illegally.

Control center 101 or printing bureau 401 tries extracting digital watermark from content or money using both method A and method B. If digital watermarks can be extracted using both method A and method B, the content or money is genuine. If a digital watermark can be extracted using only method A or only method B, the content or the money is counterfeit. Control center 101 or the police can identify a counterfeiter based on the extracted digital watermark information from illegally copied digital content. If no digital watermark can be extracted using both method A and method B, the content or the money was not embedded with any digital watermarks. It is easy to understand that this embodiment has the same effect as the first and second embodiments.

The above-mentioned embodiment is explained in the case where control center 101 or printing bureau 401 embeds two digital watermarks using method A and method B. Of course, control center 101 or printing bureau 401 may use three or more digital watermarks. It is apparent that security for counterfeiting improves as the number of digital watermark methods being employed increases. Digital watermark A and digital watermark B may use the same information or they may differ. In the case where three or more digital watermarks are used, the digital watermarks may be embedded in the digital content each using a different method or part of the digital watermarks using the same method and the remainder using different methods.

Fourth Embodiment

The objects of the present invention can also be achieved by providing a storage medium storing program codes for performing the aforesaid processes in a system or an apparatus, reading the program codes from the storage medium using a computer (e.g., CPU, MPU) of the system or apparatus and then executing the program.

In this case, the program codes read from the storage medium realize the functions according to the previous embodiments.

Further, the storage medium, such as a floppy disk, hard disk, optical disk, magneto-optical disk, CD-ROM, CD-R, magnetic tape, non-volatile type memory card, or ROM, can be used for providing the program codes.

Furthermore, besides the aforesaid functions according to the above embodiments being realized by executing the program codes which are read by a computer, the present invention includes a case where an Operating System (OS) or the like working on the computer performs a part of or the entire process in accordance with designations of the program codes and realizes the functions according to the above embodiments.

The above-mentioned embodiments provide a system which uses a plurality of digital watermark methods for digital content. Some of the digital watermarks are removed by a person making illegal copies. After the counterfeiter has removed some of the digital watermarks, the person believes that all digital watermarks have been destroyed when in fact others remain. As a result, the system can protect digital content from illegal copying and is useful for digital content businesses or preventing counterfeiting.

Protection of content can be realized by a system employing a plurality of digital watermarks differing in their difficulty to be analyzed. After the counterfeiter removes those digital watermarks that are easy to destroy, the person believes that all digital watermarks have been removed when in fact others remain. Accordingly, the differing difficulty in analyzing the digital watermarks provides a strong system for preventing illegal copying.

What is claimed is:

1. A digital content processing method comprising the steps of:

adding information by using a plurality of copyright protection processes on the same digital content; and outputting the processed digital content, wherein each of the plurality of copyright protection processes differs in difficulty of being analyzed, wherein the plurality of copyright protection processes include a confidential copyright protection process and a non-confidential copyright protection process, wherein information added by the confidential copyright protection process contains both first and second information and information added by the non-confidential copyright protection process contains the first information, wherein it can be determined that an illegal process has been performed on the digital content when the first information added by the confidential copyright protection process can be extracted from the digital content and the first information added by the non-confidential copyright protection process cannot be extracted, and wherein the second information includes information that can identify the person who performed the illegal process on the digital content.

2. A digital content processing method according to claim 1, wherein each of the plurality of copyright protection processes embeds a digital watermark in the digital content, each digital watermark differing in method of embedment.

3. A method according to claim 1, wherein a confidential copyright protection process is a process for which at least one of (i) an embedding method and (ii) existence of the process is kept confidential.

4. A digital content processing method according to claim 1, wherein the first information is information related to a user who purchases the digital content.

5. A digital content processing method according to claim 1, wherein the second information is confidential information.

6. A computer program product, comprising a computer readable medium having computer program codes, for processing digital content, said codes including:

performing procedure codes for adding information by using a plurality of copyright protection processes on the same digital content, wherein the processed digital content is distributed, wherein each of the plurality of copyright protection processes differs in difficulty of being analyzed, wherein the plurality of copyright protection processes include a confidential copyright protection process and a non-confidential copyright protection process, wherein information added by the confidential copyright protection process contains both first information and second information and information added by the non-confidential copyright protection process contains the first information, wherein it can be determined that an illegal process has been performed on the digital content when the first information added by the confidential copyright protection process can be extracted from the digital content and the first information added by the non-confidential copyright protection process cannot be extracted, and wherein the second information includes information that can identify the person who performed the illegal process on the digital content.

7. A computer program product according to claim 6, wherein the first information is information related to a user who purchases the digital content.

8. A computer program product according to claim 6, wherein the second information is confidential information.

9. A digital content processing method comprising the steps of:

performing a plurality of copyright protection processes on the same digital content;

outputting a first extracting unit for part of the plurality of copyright protection processes;

extracting information from the digital content using the first extracting unit for part of the plurality of copyright protection processes and a second extracting unit for the remaining copyright protection processes, wherein the first extracting unit is for extracting first information and the second extracting unit is for extracting both the first information and second information, wherein it can be determined that an illegal process has been performed on the digital content when the first information can be extracted from the digital content using the second extracting unit but not using the first extracting unit, and wherein the second information includes information that can identify the person who performed the illegal process on the digital content.

10. A digital content processing method according to claim 9, wherein each of the plurality of copyright protection processes embeds a digital watermark in the digital content, each digital watermark differing in method of embedment and robustness against attack.

11. A digital content processing method according to claim 9, wherein the information extracted by the second extracting unit is more robust than the information extracted by the first extracting unit.

12. A digital content processing method according to claim 9, wherein the first extracting unit differs from the second the extracting unit.

13. A digital content processing method according to claim 9, wherein the first extracting unit is software distributed through a network.

14. A digital content processing method according to claim 9, wherein the first extracting unit is software stored on a storage medium, wherein the storage medium containing the first extracting unit is distributed.

15. A computer program product, comprising a computer readable medium having computer program codes, for processing digital content, said codes including:

code for performing a plurality of copyright protection processes on the same digital content, wherein information is extracted from the digital content using a first extracting unit for part of the copyright protection processes and using a second extracting unit for the remaining copyright protection processes, wherein the the first extracting unit is for extracting first information and the second extracting unit is for extracting both the first information and second information, wherein it can be determined that an illegal process has been performed on the digital content when the first information can be extracted from the digital content using the second extracting unit but not using the first extracting unit, and wherein the second information includes information that can identify the person who performed the illegal process on the digital content.

16. A valuable paper processing method comprising the steps of:

adding information by using a plurality of counterfeit prevention processes in the same valuable paper; and outputting the processed valuable paper, wherein each of the plurality of counterfeit prevention processes differs in difficulty of being analyzed, wherein the plurality of counterfeit prevention processes include a confidential counterfeit prevention process and a non-confidential counterfeit prevention process, wherein information added by the confidential counterfeit prevention process contains both first and second information and information added by the non-confidential counterfeit prevention process contains the first information, wherein it can be determined that an illegal process has been performed on the valuable paper when the first information added by the confidential counterfeit prevention process can be extracted from the valuable paper and the first information added by the non-confidential counterfeit prevention process cannot be extracted, and wherein the second information includes information that can identify the person who performed the illegal process on the valuable paper.

17. A valuable paper processing method according to claim 16, wherein each of the plurality of counterfeit prevention processes embeds a digital watermark in the valuable paper, each digital watermark differing in method of embedment and robustness against attack.

18. A computer program product, comprising a computer readable medium having computer program codes, for processing valuable paper, said codes including:

code for adding information by using a plurality of counterfeit prevention processes in the same valuable paper, wherein the processed valuable paper is output, wherein each of the plurality of counterfeit prevention processes differs in difficulty of being analyzed, wherein the plurality of counterfeit prevention processes include a confidential counterfeit prevention process and a non-confidential counterfeit prevention process, wherein information added by the confidential counterfeit prevention process contains both first and second information and information added by the non-confidential counterfeit prevention process contains the first information, wherein it can be determined that an illegal process has been performed on the valuable paper when the first information added by the confidential counterfeit prevention process can be extracted from the valuable paper and the first information added by the non-confidential counterfeit prevention process cannot be extracted, and wherein the second information includes information that can identify the person who performed the illegal process on the valuable paper.

19. A valuable paper processing method comprising the steps of:

performing a plurality of counterfeit prevention processes in the same valuable paper;

outputting a first extracting unit for part of the plurality of counterfeit prevention processes;

extracting information from the valuable paper using the first extracting unit for part of the counterfeit prevention processes and a second extracting unit for the remaining counterfeit prevention processes, wherein the first extracting unit is for extracting first information and the second extracting unit is for extracting both the first information and second information, wherein it can be determined that an illegal process has been performed on the valuable paper when the first information can be extracted from the valuable paper using the second extracting unit but not using the first extracting unit, and wherein the second information includes information that can identify the person who performed the illegal process on the valuable paper.

20. A valuable paper processing method according to claim 19, wherein each of the plurality of counterfeit prevention processes embeds a digital watermark in the valuable paper, each digital watermark differing in method of embedment and robustness against attack.

21. A valuable paper processing method according to claim 19, wherein the first extracting unit is a robust digital watermark extracting unit, and the second extracting unit is kept confidential.

22. A valuable paper processing method according to claim 19, wherein the first extracting unit is software distributed through a network.

23. A valuable paper processing method according to claim 19, wherein the first extracting unit is software stored on a storage medium, wherein the storage medium containing the first extracting unit is distributed.

24. A computer program product, comprising a computer readable medium having computer program codes, for processing valuable paper, said codes including:

codes for performing a plurality of counterfeit prevention processes in the same valuable paper, wherein information is extracted from the valuable paper using a first extracting unit for part of the counterfeit prevention processes, which include a confidential counterfeit prevention process, and using a second extracting unit for the remaining counterfeit prevention processes, which include a non-confidential counterfeit prevention process, wherein information embedded by the confidential counterfeit prevention process contains both first and second information and information embedded by the non-confidential counterfeit prevention process contains the first information, wherein it can be determined that an illegal process has been performed on the valuable paper when the first information added by the confidential counterfeit prevention process can be extracted from the valuable paper and the first information added by the non-confidential counterfeit prevention process cannot be extracted, and wherein the second information includes information that can identify the person who performed the illegal process on the valuable paper.

25. A processing method comprising the steps of:

a first embedding step for embedding a digital watermark in digital content;

a second embedding step for embedding a digital watermark in a manner more robust than the first embedding step in the digital content; and outputting the digital content embedded with the digital watermarks which are embedded by the first embedding step and the second embedding step, wherein the first embedding step uses a non-confidential process and the second embedding step uses a confidential process, wherein the first embedding step and the second embedding step are each used to embed a digital watermark including first information, and the second embedding step is further used to embed a second digital watermark including second information that is different from the first information, wherein it can be determined that an illegal process has been performed on the digital content when the first information added by the confidential process can be extracted from the digital content and the first information added by the non-confidential process cannot be extracted, and wherein the second information includes information that can identify the person who performed the illegal process on the digital content.

26. A processing method according to claim 25, further comprising the step of distributing a first extracting software for extracting the first digital watermark, wherein a second extracting software for extracting the second digital watermark is kept confidential.

27. A processing method according to claim 25, further comprising the steps of:
performing processing for extracting the first digital watermark using first extracting software; and
performing processing for extracting the second digital watermark using second extracting software,
wherein if the first digital watermark is unable to be extracted using the first extracting software and the second digital watermark is able to be extracted using the second extracting software, the first digital watermark is considered to have been removed from the digital content.

28. A processing method according to claim 25, wherein the first digital watermark and the second digital watermark are embedded in the digital content using one of a method embedding information in a spatial area and a method embedding information in a frequency area.

29. A processing method according to claim 25, wherein the second digital watermark contains personal information of a buyer of the digital content.

30. A processing method according to claim 25, further comprising the steps of:
performing processing for extracting the digital watermark including the first information embedded by the first embedding step; and
informing a controlling center for controlling the digital content when the first digital watermark including the first information is not extracted in the performing step.

31. A processing method according to claim 25, further comprising the steps of:
performing processing for extracting the digital watermark including the first information embedded using each of the first embedding step and the second embedding step;
performing processing for extracting the second digital watermark including the second information; and
identifying a person making an illegal copy on the basis of the extracted second digital watermark in case the digital watermark including the first information embedded using the non-confidential process is not extracted in the first performing step and the digital watermark including the first information embedding using the confidential process is extracted in the first performing step.

32. A computer program product, comprising a computer readable medium having computer program codes, for distributing digital content, said codes including:
a first embedding procedure code for embedding a digital watermark in digital content;
a second embedding procedure code for embedding a digital watermark in a manner more robust than the first embedding step in the digital content, and
outputting the digital content embedded with digital watermarks which are embedded by the first embedding step and the second embedding step,
wherein the first embedding step uses a non-confidential process and the second embedding step uses a confidential process,
wherein the first embedding step and the second embedding step are each used to embed a digital watermark including first information, and the second embedding step is further used to embed a second digital watermark that includes second information that is different from the first information,
wherein it can be determined that an illegal process has been performed on the digital content when the first information added by the confidential process can be extracted from the digital content and the first information added by the non-confidential process cannot be extracted, and
wherein the second information includes information that can identify the person who performed the illegal process on the digital content.

33. A processing system comprising:
first embedding means for embedding a digital watermark in digital content;
second embedding means for embedding a digital watermark in a manner more robust than the first embedding step in the digital content; and
outputting means for outputting the digital content embedded with digital watermarks which are embedded by the first embedding step and the second embedding step,
wherein the first embedding step uses a non-confidential process and the second embedding step uses a confidential process,
wherein the first embedding step and the second embedding step embed a digital watermark including first information, and the second embedding step is further used to embed a second digital watermark that includes second information that is different from the first information,
wherein it can be determined that an illegal process has been performed on the digital content when the first information added by the confidential process can be extracted from the digital content and the first information added by the non-confidential process cannot be extracted, and
wherein the second information includes information that can identify the person who performed the illegal process on the digital content.

34. A processing method comprising the steps of:
a first embedding step for embedding a digital watermark in valuable paper;
a second embedding step for embedding a digital watermark in a manner more robust than the first embedding step in the valuable paper; and
outputting the valuable paper embedded with digital watermarks which are embedded by the first embedding step and the second embedding step,
wherein the first embedding step uses a non-confidential process and the second embedding step uses a confidential process,
wherein the first embedding step and the second embedding step each are used to embed a digital watermark including first information, and the second embedding step is further used to embed a second digital watermark that includes second information that is different from the first information, wherein it can be determined that an illegal process has been performed on the valuable paper when the first information added by the confidential process can be extracted from the valuable paper and the first information added by the non-confidential process cannot be extracted, and wherein the second information includes information that can identify the person who performed the illegal process on the valuable paper.

35. A computer program product, comprising a computer readable medium having computer program codes, for circulating valuable paper, said codes including:

a first embedding procedure code for embedding a digital watermark in valuable paper; and a second embedding procedure code for embedding a digital watermark in a maimer more robust than the first embedding step in the valuable paper, wherein the valuable paper embedded with digital watermarks using both the first embedding step and the second embedding step is output, wherein the first embedding step uses a non-confidential process and the second embedding step uses a confidential process, wherein the first embedding step and the second embedding step are each used to embed a digital watermark that includes first information, and the second embedding step is further used to embed a second digital watermark that includes second information that is different from the first information, wherein it can be determined that an illegal process has been performed on the valuable paper when the first information added by the confidential process can be extracted from the valuable paper and the first information added by the non-confidential process cannot be extracted, and wherein the second information includes information that can identify the person who performed the illegal process on the valuable paper.

36. A processing system comprising:

first embedding means for embedding a digital watermark in valuable paper; and second embedding means for embedding a digital watermark in a manner more robust than the first embedding step in the valuable paper; and wherein the valuable paper embedded with digital watermarks embedded using both the first embedding step and the second embedding step is output, wherein the first embedding step uses a non-confidential process and the second embedding step uses a confidential process, wherein the first embedding step and the second embedding step are each used to embed a digital watermark including first information, and the second embedding step is further used to embed a second digital watermark that includes second information is different from the first information, wherein it can be determined that an illegal process has been performed on the valuable paper when the first information added by the confidential process can be extracted from the valuable paper and the first information added by the non-confidential process cannot be extracted, and wherein the second information includes information that can identify the person who performed the illegal process on the valuable paper.

* * * * *

UNITED STATES PATENT AND TRADEMARK OFFICE
CERTIFICATE OF CORRECTION

PATENT NO.        : 7,158,652 B2
APPLICATION NO. : 09/793634
DATED             : January 2, 2007
INVENTOR(S)       : Keiichi Iwamura It is certified that error appears in the above-identified patent and that said Letters Patent is hereby corrected as shown below:

ON THE TITLE PAGE, AT ITEM (57):
In the Abstract, line 9, "analyzing" should read --analyzed--.

COLUMN 11:
Lines 2 and 42, "include" should read --includes--.

COLUMN 12:
Line 31, DELETE "the".

COLUMN 13:
Lines 2 and 34, "include" should read --includes--.

COLUMN 17:
Line 16, "maimer" should read --manner--.

COLUMN 18:
Line 22, DELETE "is".

Signed and Sealed this

Twenty-second Day of May, 2007

JON W. DUDAS
*Director of the United States Patent and Trademark Office*